(12) United States Patent
Choi et al.

(10) Patent No.: US 8,560,497 B2
(45) Date of Patent: Oct. 15, 2013

(54) INTER-HOME SHARING APPARATUS AND METHOD USING HOME NETWORK DEVICE

(75) Inventors: Sang-hoon Choi, Seoul (KR); Yoon-soo Kim, Suwon-si (KR); Joon-ho Cho, Suwon-si (KR); Hyun-sik Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 390 days.

(21) Appl. No.: 12/020,875

(22) Filed: Jan. 28, 2008

(65) Prior Publication Data
US 2008/0243869 A1    Oct. 2, 2008

(30) Foreign Application Priority Data

Mar. 30, 2007    (KR) .................. 10-2007-0031946

(51) Int. Cl.
*G06F 7/00* (2006.01)
*G06F 17/30* (2006.01)

(52) U.S. Cl.
USPC ............ 707/622; 707/661; 707/736; 707/758

(58) Field of Classification Search
None
See application file for complete search history.

(56) References Cited

U.S. PATENT DOCUMENTS

| | | | |
|---|---|---|---|
| 7,483,958 B1 * | 1/2009 | Elabbady et al. | 709/217 |
| 2003/0097381 A1 * | 5/2003 | Detweiler et al. | 707/201 |
| 2005/0150358 A1 * | 7/2005 | Yanase et al. | 84/600 |
| 2006/0129818 A1 | 6/2006 | Kim et al. | |
| 2006/0161635 A1 * | 7/2006 | Lamkin et al. | 709/217 |
| 2006/0253551 A1 | 11/2006 | Jun | |
| 2007/0157281 A1 * | 7/2007 | Ellis et al. | 725/134 |
| 2007/0233613 A1 * | 10/2007 | Barrus et al. | 705/71 |
| 2008/0112683 A1 * | 5/2008 | Lin et al. | 386/52 |

FOREIGN PATENT DOCUMENTS

| | | |
|---|---|---|
| CN | 1838630 A | 9/2006 |
| KR | 10-2006-0055263 A | 5/2006 |
| KR | 10-2007-0048922 A | 5/2007 |
| KR | 1020080024582 A | 3/2008 |
| WO | 2006085289 A2 | 8/2006 |

OTHER PUBLICATIONS

Korean Office Action issued on Apr. 4, 2011 in the corresponding Korean Patent Application No. 10-2007-0031946.
Communication dated Jul. 27, 2011 from the State Intellectual Property Office of P.R. China in a counterpart application No. 200810080579.1.
Chinese Office Action dated May 9, 2012 issued in counterpart Chinese Patent Application No. 200810080579.1.
Communication, dated Oct. 12, 2012, issued by the State Intellectual Property Office of the People's Republic of China in counterpart Chinese Patent Application No. 200810080579.1.
Communication dated Jul. 17, 2013 from the State Intellectual Property Office of P.R. China in a counterpart application No. 200810080579.1.

* cited by examiner

*Primary Examiner* — Sangwoo Ahn
(74) *Attorney, Agent, or Firm* — Sughrue Mion, PLLC

(57) ABSTRACT

An inter-home content sharing apparatus and method are provided. The inter-home content sharing apparatus includes a home network protocol stack which communicates with the home network devices according to a home network protocol; a remote storage controller which receives a request for sharing content from the home network devices through the home network protocol, connects to a remote storage to upload the content, and controls the remote storage to extract metadata of the content; and a message controller which controls transception of notification messages including sharing information on the uploaded content.

17 Claims, 8 Drawing Sheets

INTER-HOME SHARING APPARATUS AND METHOD USING HOME NETWORK DEVICE

CROSS-REFERENCE TO RELATED PATENT APPLICATION

This application claims priority from Korean Patent Application No. 10-2007-0031946, filed on Mar. 30, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to a home network, and more particularly, to an inter-home content sharing method and apparatus.

2. Description of the Related Art

Home network technology allows all digital devices in the home to connect through a network and provides remote control, multimedia services, information services, and the like. Examples of network terminals include computer-based devices such as notebook computers and personal digital assistants (PDAs) and domestic appliances such as refrigerators, televisions (TVs), and set-top boxes.

Home network terminals communicate with each other by using the same home network middleware to provide home network services. Examples of a type of the middleware include universal plug and play (UPnP) led by Microsoft and Intel, Jini developed by Sun, and home audio video interoperability (HAVi). Of these, the UPnP is the most widely used and has practically become a standard in the home network middleware field on the basis of larger firms.

The UPnP minimizes user involvement and performs a function of remote method invocation. In addition, the UPnP has functions of network auto-completion, service discovery, simple object access protocol (SOAP)-based remote method invocation, event-based status information confirmation, and the like. In addition to the aforementioned basic functions, the UPnP defines a device control protocol (DCP) for home network devices such as a printer.

With the spread of Internet use, the use of large-capacity and always-active connection networks through cable television (CATV), a digital subscriber line (xDSL), a high-speed communication network, or the like continues to expand, and networking between a personal computer (PC) and peripheral devices through a wireless local area network (LAN) continues to grow. In addition, with the acceleration of digitizing and the expansion of communication infra-structures, environments in which electronic devices, information and communication devices, and domestic appliances are digitized to connect each other through a single network and can share image and sound information with each other have been provided.

In this situation, as digital electronic devices connected to a home network have been commonly used, exchanging contents stored in the digital electronic devices between users increases. In general, exchanging contents is performed by using PCs. This method may cause inconvenience when a user wants to share contents stored in a home network device with another user. This is because the user has to perform retrieving, downloading, and transmitting the contents by using the PC.

FIG. 1 is a schematic view showing a system for transmitting contents stored in a home network device to another user according to the related art.

Referring to FIG. 1, a method of transmitting contents stored in a home network device to another user, in an environment in which a home network is implemented, is shown. The user who wants to transmit the contents retrieves contents of a home device 101 by using a PC 102, downloads the contents to the PC 102, and transmits the contents to a PC 112 of a receiver.

In the related art method, content sharing is performed on the PC basis. When the user wants to transmit contents in the home network device to another user, the user has to use the PC. In addition, applications used to control the home network device and transmit the contents to another user have to be installed in the PC.

In this method, the user performs all operations associated with content transmission on the PC basis, so that procedures are complex and inconvenient. In addition, the method cannot be used by a user who is unfamiliar with manipulating the PC.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an inter-home content sharing method and apparatus using home network devices capable of simply performing content sharing between users by using only the home network devices and not using a personal computer (PC), sharing contents with other users by an operation of simply pressing a button of a remote controller of the home network, and allowing a content receiver to easily check and use the shared content.

According to an aspect of the present invention, there is provided an inter-home content sharing apparatus using home network devices, including: a home network protocol stack which communicates with the home network devices according to a home network protocol; a remote storage controller which receives a request for sharing content from the home network device through the home network protocol, connects to a remote storage to upload the content, and controls the remote storage to extract metadata of the content; and a message controller which controls transception of notification messages including sharing information on the uploaded content.

According to another aspect of the present invention, there is provided an inter-home content sharing system using home network devices, the system including: two or more inter-home content sharing apparatuses, each of which comprising: a home network protocol stack which communicates with the home network devices according to a home network protocol; a remote storage controller which receives a request for sharing contents from the home network device through the home network protocol stack, connects to a remote storage to upload the contents, and controls the remote storage to extract metadata of the contents; and a message controller which controls transception of notification messages including sharing information on the uploaded contents; the home network devices which are connected to the inter-home content sharing apparatus through a home network and request a transmitting inter-home content sharing apparatus to share contents or release content sharing; and a remote storage which is connected to two or more inter-home content sharing apparatuses through an Internet, stores contents uploaded by the transmitting inter-home content sharing apparatus, extracts metadata of the uploaded contents, and transmits the metadata to a receiving inter-home content sharing apparatus.

According to another aspect of the present invention, there is provided an inter-home content sharing method using home network devices, the method including: receiving a notification message including sharing information on uploaded contents from a transmitting inter-home content sharing apparatus which uploads contents to a remote storage; connecting to the remote storage according to the received notification message to check the uploaded contents and downloading metadata of the contents; and transmitting an event message based on the metadata to a receiving home network device.

According to another aspect of the present invention, there is provided an inter-home content sharing method using home network devices, the method including: receiving a notification message including information on content from a transmitting inter-home content sharing apparatus which uploads the content to a remote storage; connecting to the remote storage according to the received notification message to check the uploaded content and downloading sample data of the content; and extracting metadata based on the sample data and transmitting an event message based on the extracted metadata to a receiving home network device.

According to another aspect of the present invention, there is provided an inter-home content sharing method using home network devices, the method including: receiving a request for sharing content from a transmitting home network device; uploading the content to a remote storage according to the sharing request; and transmitting a notification message including sharing information on the uploaded content to a receiving inter-home content sharing apparatus.

According to another aspect of the present invention, there is provided a computer readable recording medium having recorded thereon a program for executing the above described methods.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the attached drawings.

Figure 1:
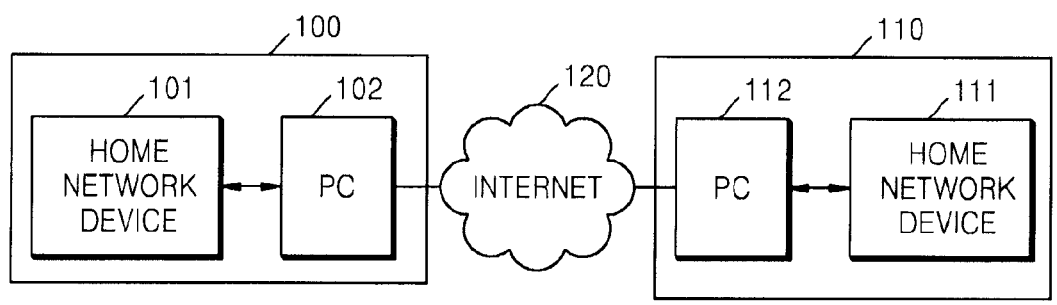
FIG. 1 is a schematic view showing a system for transmitting contents stored in a home network device to another user according to a related art.
Figure 2:
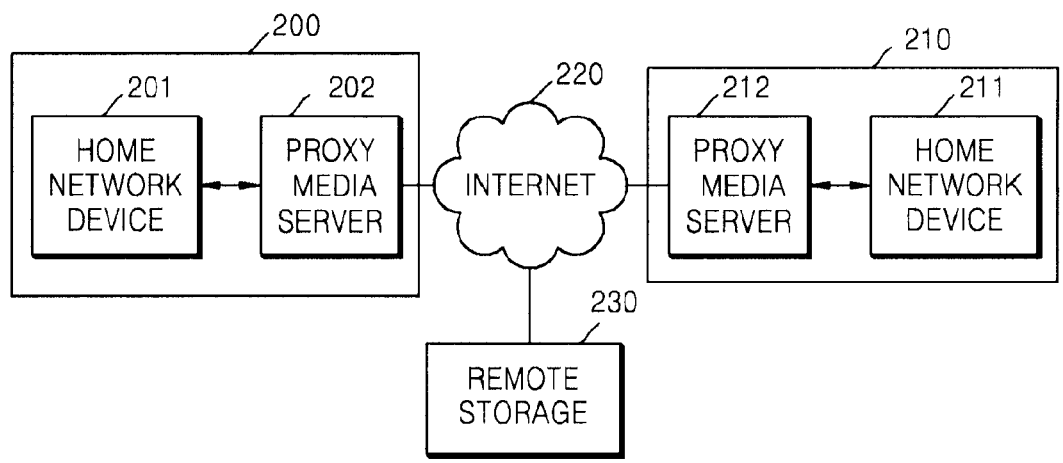
FIG. 2 is a schematic view showing a system for sharing contents between users according to an exemplary embodiment of the present invention.

FIG. 2 is a schematic view showing a system for sharing contents between users according to an exemplary embodiment of the present invention.

Referring to FIG. 2, the system for sharing contents includes a home network device 201 and a proxy media server (hereinafter, referred to as PMS) 202 installed in a transmitter's home 200, a home network device 211 and a PMS 212 installed in a receiver's home 210, a remote storage 230, and Internet 220 for connecting the PMSs 202 and 212 and the remote storage 230 with each other.

The home network devices 201 and 211 transceive information associated with content transmission with the PMSs 202 and 212, respectively, according to a home network protocol. Each of the home network devices 201 and 211 includes electronic devices, information and communication devices, and domestic appliances which are installed in the home and connected through a home network. The home network may be constructed with power lines, wired lines, or wirelessly, and is not limited thereto.

The PMSs 202 and 212 receive a content transmission request from the home network protocol and automatically perform operations associated with the content transmission, so that the users can use a content sharing function by using the home network devices 201 and 211. Therefore, the content sharing function can be provided to users who are unused to manipulating a personal computer (PC).

In addition, since the PMSs 202 and 212 follow the home network protocol, the users can use the content sharing function by using various home network devices in the home, which follow a standard. Therefore, the content sharing function can be used through multi-vendor home network devices.

The PMSs 202 and 212 mainly have two types. One type is defined in terms of content transmission. A transmitting PMS, for example, the PMS 202 which is installed in the content transmitter's home 200 uploads contents to the remote storage 230 and transmits a notification message to a receiving PMS, for example, the PMS 212. The second type is defined in terms of content reception. The receiving PMS 212 receives the notification message transmitted from the transmitting PMS 202, checks which content is shared or deleted, constructs metadata according to the checked information, and transmits an event message to the home network device 211 in the home 210.

Detailed structures and functions of the PMSs 202 and 212 are described later with reference to FIGS. 3 and 4.

The remote storage 230 stores data so that the PMSs 212 and 212 can connect to one another to share content. In addition, the remote storage 230 is connected to each of the PMSs 202 and 212 through a network. According to the current exemplary embodiment of the present invention, the network uses the Internet, however, a storage area network (SAN) or a broadband network may be used. The remote storage 230 may selectively extract metadata for contents which the user wants to share in order to provide the metadata to a PMS of another user.

Figure 3:
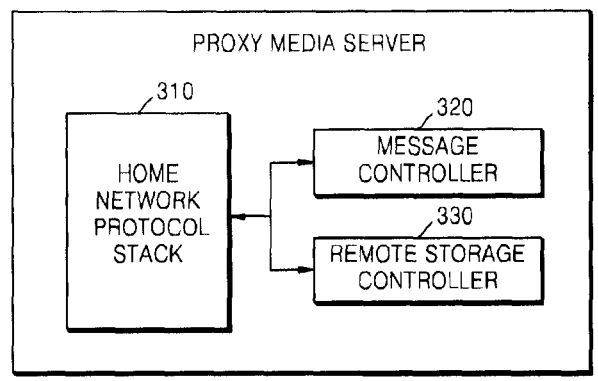
FIG. 3 is a schematic view showing a structure of a PMS according to another exemplary embodiment of the present invention.

FIG. 3 is a schematic view showing a structure of a PMS according to another exemplary embodiment of the present invention.

Referring to FIG. 3, the PMS includes a home network protocol stack 310, a message controller 320, and a remote storage controller 330.

The home network protocol stack 310 communicates with external home network devices. According to an operation request from the external device, the home network protocol stack 310 uses an internal module and returns a response message. Although there is no request from the external device, the home network protocol stack 310 may transmit an event message when an internal status is changed.

The message controller 320 transceives a notification message with other PMSs. Here, the notification message is transmitted from the transmitting PMS to the receiving PMS when a new content is shared or an existing content is deleted, and may include information on a name or an access address of the content.

The remote storage controller 330 controls communication with the remote storage 230. Specifically, the remote storage controller 330 connects to the remote storage 230 and performs functions of collecting metadata information on contents, uploading contents, and downloading content sample data. Here, the downloading sample data is performed to collect content metadata. In addition, the remote storage controller 330 generates uniform resource locators (URL) by using a key value of content. Through the URL, other external devices can connect to corresponding contents.

Figure 4:
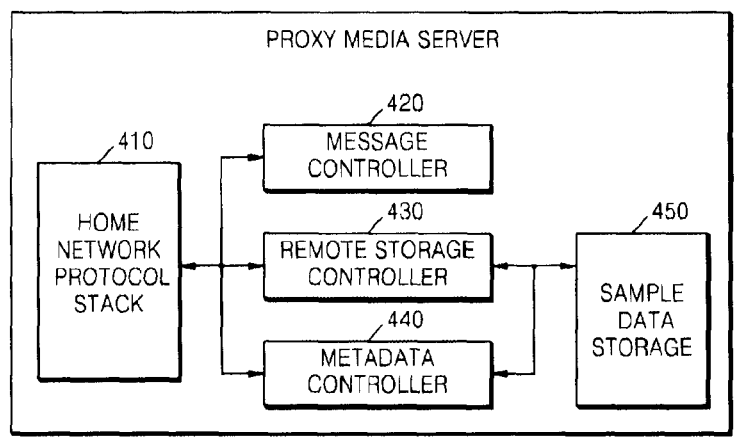
FIG. 4 is a schematic view showing a structure of a PMS according to another exemplary embodiment of the present invention.

FIG. 4 is a schematic view showing a structure of a PMS according to another exemplary embodiment of the present invention.

Referring to FIG. 4, the PMS further includes a metadata controller 340 and a sample data storage 350 in addition to the structure of the PMS shown in FIG. 3. This construction is provided in case the remote storage 230 cannot return metadata requested by the PMS. In other words, when the remote storage 230 cannot return the metadata, the PMS extracts a part of a media file and performs a function of extracting content metadata.

The metadata controller 340 extracts metadata from content sample data stored in the sample data storage 350. Accordingly, when the remote storage 230 cannot return metadata requested by the home network protocol, the metadata controller 340 can generate its own metadata. Here, the metadata is data about data and means data for describing characteristics of information resources. Specifically, the metadata is not data to be practically stored, for example, video and audio, but is data for providing information directly or indirectly associated with the data.

The sample data storage 350 stores sample data of contents. Here, the sample data of the contents include basic information used to extract metadata.

The PMS shown in FIG. 3 or 4 communicates with three types of devices. The first type is a home network device. The PMS provides services for sharing contents to adjacent home network devices according to the home network protocol. The second type is the remote storage 230. The PMS performs functions of extracting metadata of contents stored in the remote storage 230, uploading contents, and downloading sample data, and the like. The third type is a PMS having a type differing from the two previously listed types. When a new content is shared or an existing content is deleted, the PMS transceives a notification message from a different PMS.

Figure 5:
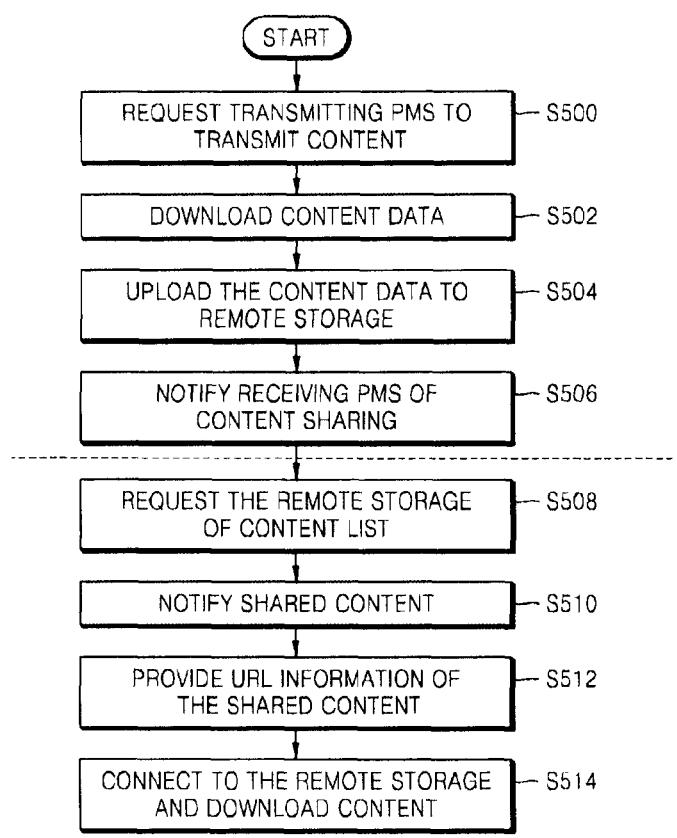
FIG. 5 is a flowchart for explaining a method of sharing contents according to another exemplary embodiment of the present invention.

FIG. 5 is a flowchart for explaining a method of sharing contents according to another exemplary embodiment of the present invention.

A protocol between home network devices may be a universal plug and play (UPnP) protocol. The UPnP is a standard used to allow devices such as a PC, peripheral devices, intelligent electronic appliances, and wireless devices to automatically recognize each other by using the Internet and a web protocol when the devices are connected to a network. In the UPnP architecture, when a user adds a device to the network, the device completes construction itself, receives a transmission control protocol/Internet protocol (TCP/IP) address, and uses a discovery protocol based on an Internet hypertext transfer protocol (HTTP) in order to inform other devices of the existence of the device.

Referring to FIG. 5, in operation 500, a user requests a transmitting PMS to transmit contents to another user. In operation 502, the transmitting PMS downloads content data stored in a media server. In operation 504, the transmitting PMS uploads the downloaded content data to a remote storage. In operation 506, the transmitting PMS informs a receiving PMS that the content is shared through a notification message.

Next, in operation 508, the receiving PMS collects the latest content information from the remote storage. In operation 510, the receiving PMS informs a control point that a new content is shared through eventing. The control point performs a function of transmitting control instructions to the home network devices. Preferably, the control point may be an independent device which transmits signals for controlling the home network devices or a device such as a personal digital assistant (PDA) or a portable terminal. For example, the control point may be a remote controller for manipulating a digital television (TV).

In operation 512, the control point hands over URL information on the shared content to a media reproducing device such as a digital TV to request the media reproducing device to reproduce the content. Here, the URL information means an access address of the remote storage. In operation 514, the media reproducing device connects to the remote storage, downloads the content data, and reproduces the downloaded content.

Figure 6:
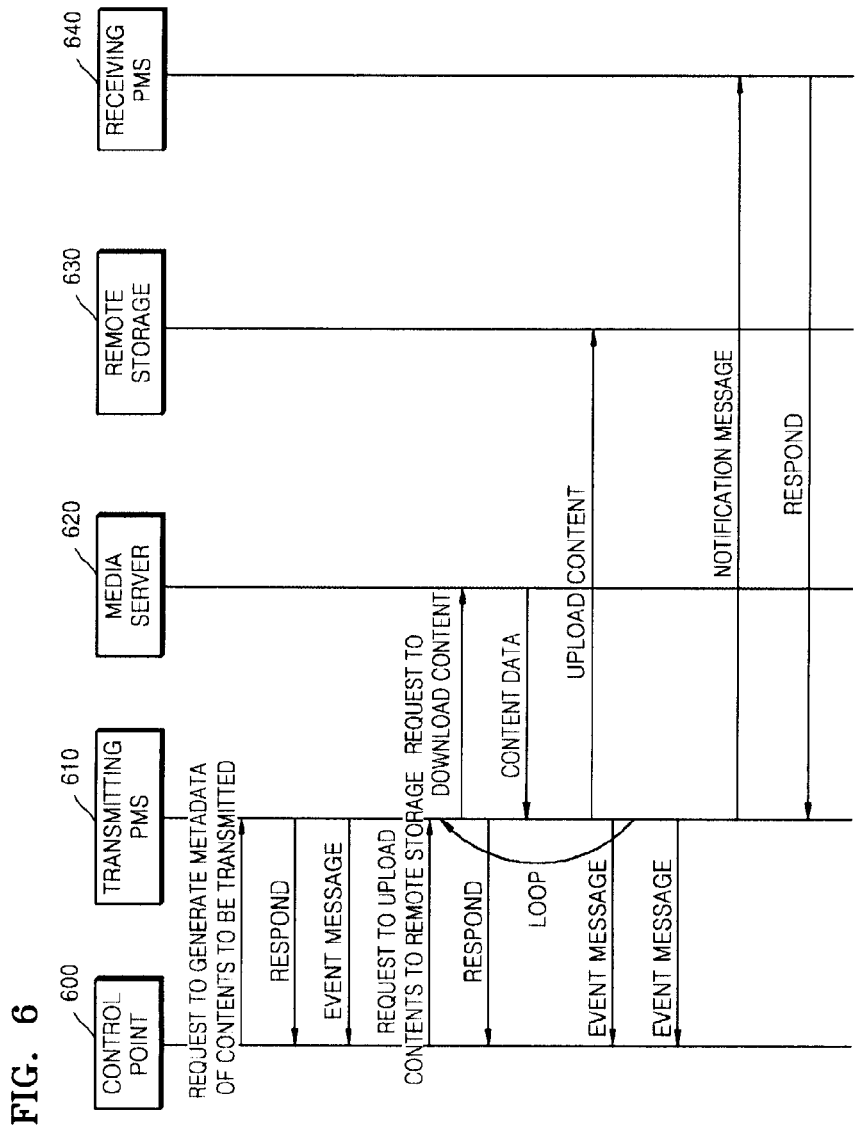
FIG. 6 is a flowchart for explaining a method of sharing contents according to another exemplary embodiment of the present invention.

FIG. 6 is a flowchart for explaining a method of sharing contents according to another exemplary embodiment of the present invention.

A control point 600 requests a transmitting PMS 610 to generate a metadata object of content to be transmitted to another user. The transmitting PMS 610 responds to the request and transmits a SystemUpdatedIDs event message after generating the metadata object. Selectively, the transmitting PMS 610 may transmit a ContainerUpdateIDs event message.

The control point 600 calls ImportResource of the transmitting PMS 610 and requests the transmitting PMS 610 to upload contents to the remote storage 630. The transmitting PMS 610 returns whether uploading contents to the remote storage 630 is possible. The transmitting PMS 610 accesses media server 620 for content data designated by the control point 600 to download the content data. The transmitting PMS 610 uploads the downloaded content data to the remote storage 630.

The transmitting PMS 610 may repeatedly download the content data from a media server 620 and uploads the content data to the remote storage 630 until all of the content data requested by the user is uploaded to the remote storage 630. In addition, the transmitting PMS 610 transmits a TransferIDs event message to the control point 610 to inform that a new transmitting operation is started.

The transmitting PMS 610 may also transmit the Transfer-IDs event message to the control point 600 in order to inform the control point 600 of transmission status information when the operation of uploading content to the remote storage 630 is completed or errors occur.

The transmitting PMS 610 allocates content information to the notification message and transmits the notification message to a receiving PMS 640 when the operation of uploading the content data is completed. Here, the receiving PMS 640 is a PMS in a receiver's home.

Figure 7:
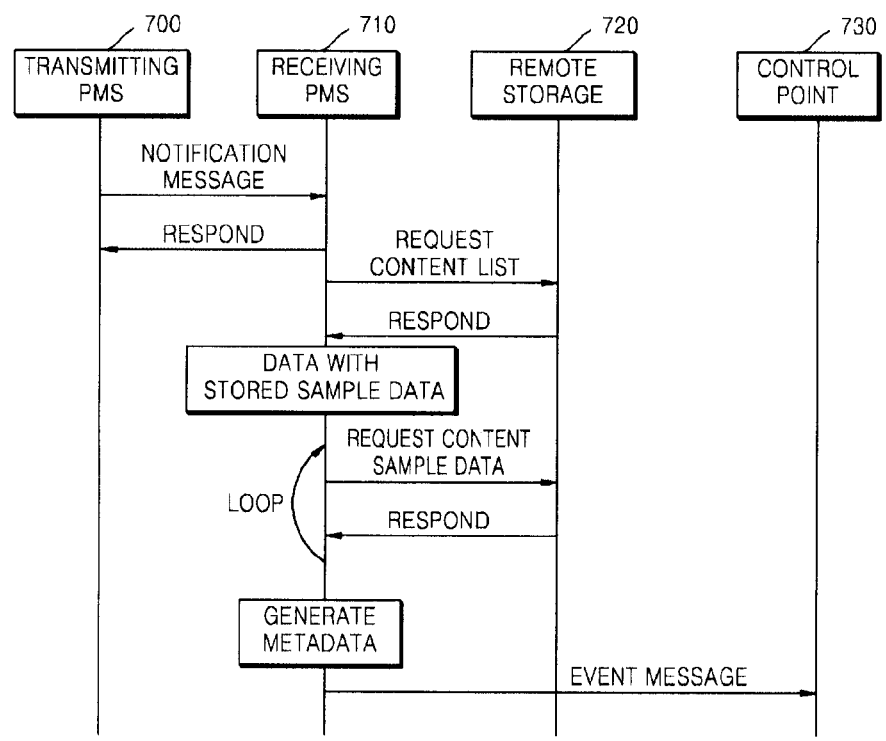
FIG. 7 is a flowchart for explaining a method of checking shared contents according to another exemplary embodiment of the present invention.

FIG. 7 is a flowchart for explaining a method of checking shared contents according to another exemplary embodiment of the present invention.

Referring to FIG. 7, a transmitting PMS 700 allocates newly shared content information to a notification message and transmits the notification message to a receiving PMS 710. Next, the receiving PMS 710 connects to a remote storage 720 to download stored content list information.

The receiving PMS 710 compares sample data of locally stored content with content information stored in the remote storage 720 to check which content does not exist locally. Next, the receiving PMS 710 connects to the remote storage 720 and downloads content sample data. The receiving PMS 710 repeatedly transmits a download request and downloads content data until all of the content sample data which does not exist locally is downloaded.

The receiving PMS 710 generates metadata based on sample data of newly downloaded content. The receiving PMS 710 transmits a SystemUpdateIDs event to a control point 730 to inform that metadata information is changed. In addition, the receiving PMS 710 may selectively transmit a ContainerUpdateIDs event.

In addition, selectively, in a case where the remote storage 720 extracts content metadata and directly provides the extracted metadata to the receiving PMS 710, the remote storage 720 may provide a function such as GetContentMetadata and return metadata information needed by a media server.

Figure 8:
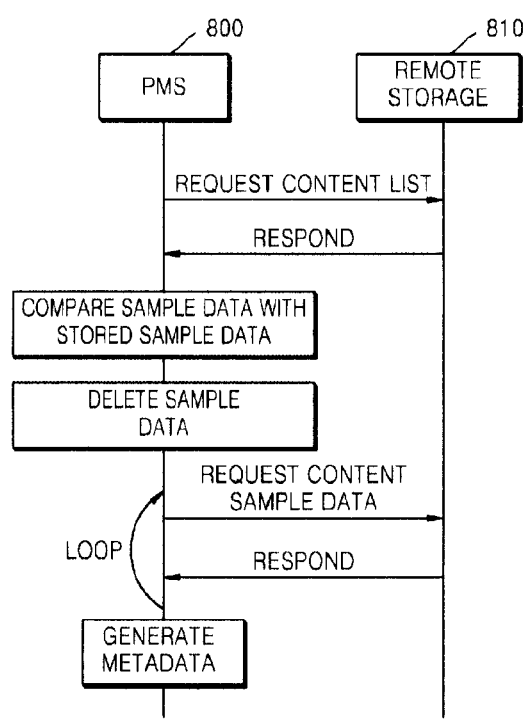
FIG. 8 is a flowchart showing boot operations of a PMS according to another exemplary embodiment of the present invention.

FIG. 8 is a flowchart showing boot operations of a PMS according to another exemplary embodiment of the present invention.

Referring to FIG. 8, a PMS 800 connects to a remote storage 810 and obtains content list information. The PMS 800 compares content information in a local storage with content information stored in the remote storage 810, and checks content information that exists in the remote storage 810 but does not exist in the local storage or content information that does not exist in the remote storage 810 but exists in the local storage.

The PMS 800 deletes sample data of the content that does not exist in the remote storage 810 but exists in the local storage. On the other hand, the PMS 800 connects to the remote storage 810 and downloads sample data of the content that exists in the remote storage 810 but does not exist in the local storage. The PMS 800 repeatedly downloads all of the sample data of the content.

The PMS 800 returns content metadata information to a control point.

Figure 9:
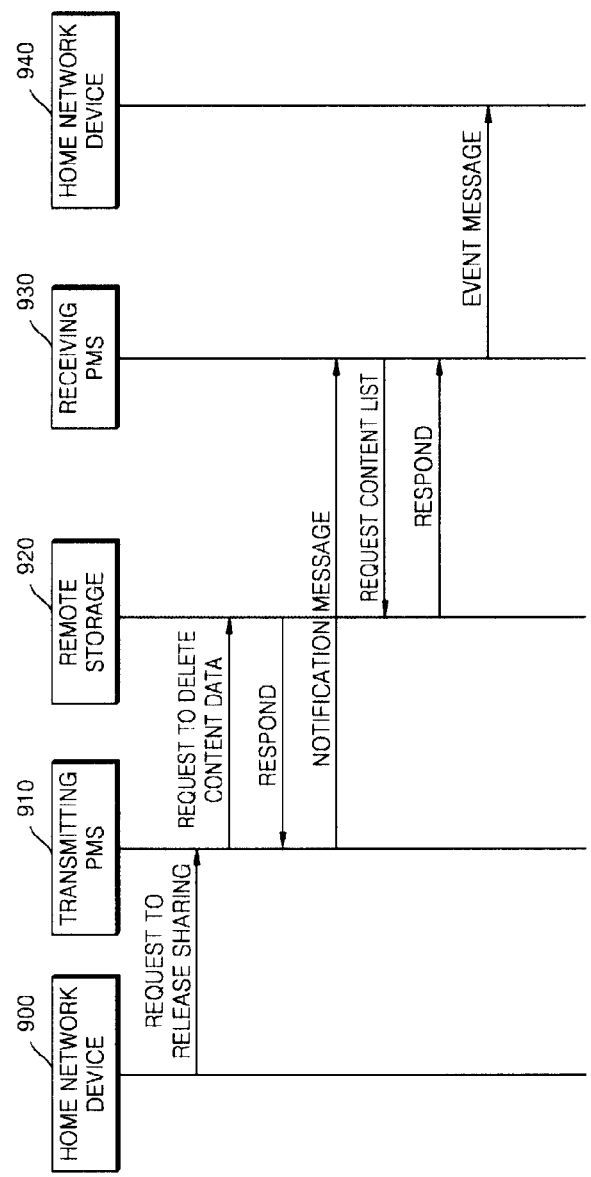
FIG. 9 is a flowchart for explaining a method of releasing content sharing according to another exemplary embodiment of the present invention.

FIG. 9 is a flowchart for explaining a method of releasing content sharing according to another exemplary embodiment of the present invention.

Referring to FIG. 9, a user requests a home network device 900 to release content sharing. A transmitting PMS 910 connects to a remote storage 920 and deletes corresponding contents. A transmitting PMS 910 transmits a notification message including the deleted content information to a receiving PMS 930. The receiving PMS 930 connects to the remote storage 920 and checks stored content information. The receiving PMS 930 notifies the home network device 940 that an event deleting the shared content has occurred.

Figure 10:
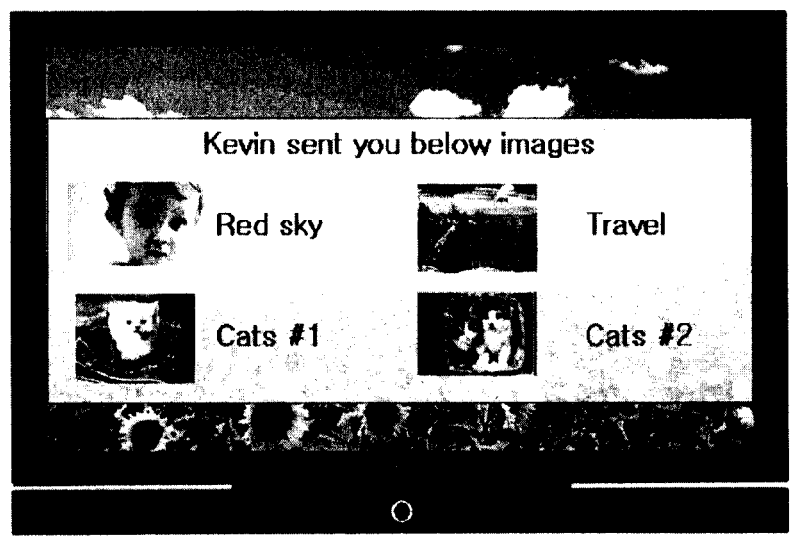
FIG. 10 is a view for explaining an application example of a content sharing function between users according to another exemplary embodiment of the present invention.

FIG. 10 is a view for explaining an application example of a content sharing function between users according to another exemplary embodiment of the present invention.

FIG. 10 shows an example of a user interface screen of a digital TV that a receiver can see. As shown in FIG. 10, the content receiver can know who shared content through the home network device. Therefore, by simply pressing a button of a remote controller, shared content information can be checked and used. The operations of content sharing are simplified as compared with a method using a PC, so that many users can easily use functions associated with the content sharing.

Accordingly, the user uses an inter-home content sharing device which can receive a request for sharing contents from the home network device according to the present invention, connect to the remote storage to upload contents, control the remote storage to extract metadata of the contents, and transceive a notification message including sharing information on the uploaded contents, so that there is an advantage in that many users can share digital media contents using a simple method.

In addition, content sharing is simply performed by using only the home network devices not using a PC, so that a user who is inexperienced in using the PC can use the content sharing function. In addition, contents can be shared with other users by using an operation of simply pressing a button of a remote controller of the home network device, and a content receiver can simply check and use the shared content.

The invention can also be exemplarily embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An inter-home content sharing apparatus using one or more home network devices, the apparatus comprising:
   a home network protocol stack which communicates with a home network device, of the one or more home network devices, according to a home network protocol;

a remote storage controller which receives a request for sharing content from the home network device through the home network protocol, connects to a remote storage, distinct from the home network device, uploads the content according to the received request, and extracts metadata of the content;

a message controller which controls transception of a notification message including sharing information on the uploaded content to be shared with other apparatus;

a sample data storage which downloads sample data of the content from the remote storage and stores the sample data; and a metadata controller which extracts sample data from the sample data storage and generates metadata based on the extracted sample data, wherein, the remote storage controller compares the stored sample data with sharing information on the uploaded content, connects to the remote storage, and downloads sample data which does not exist in the sample data storage, and wherein the sample data is a portion of the content for generating the metadata.

2. The apparatus of claim 1, wherein the home network protocol stack transmits an event message based on the extracted metadata to the home network device.

3. The apparatus of claim 1, wherein the home network protocol stack transmits an event message corresponding to the sharing request of the home network device to the home network device.

4. The apparatus of claim 1, wherein the remote storage controller generates a uniform resource locator (URL) of the remote storage by using a key value corresponding to the uploaded content.

5. The apparatus of claim 1, wherein the remote storage controller connects to the remote storage which receives a request of releasing the content sharing from the home network device, and deletes contents corresponding to the request of releasing the content sharing.

6. The apparatus of claim 5, wherein the notification message includes information on the content sharing release.

7. The apparatus of claim 1, wherein the remote storage controller compares contents stored in the remote storage with sample data stored in the sample data storage when the apparatus is booted up.

8. The apparatus of claim 1, wherein the home network protocol is Universal Plug and Play (UPnP).

9. An inter-home content sharing system using home network devices, the system comprising:

two or more inter-home content sharing apparatuses, each of which comprising:

a home network protocol stack which communicates with the home network devices according to a home network protocol;

a remote storage controller which receives a request for sharing contents from a home network device, of the home network devices, through the home network protocol stack, connects to a remote storage, uploads the contents according to the received request, and extracts metadata of the content;

a message controller which controls transception of a notification message including sharing information on the uploaded contents to be shared with other apparatus;

a sample data storage which downloads sample data of the content from the remote storage and stores the sample data; and a metadata controller which extracts sample data from the sample data storage and generates metadata based on the extracted sample data, wherein, the remote storage controller compares the stored sample data with sharing information on the uploaded content, connects to the remote storage, and downloads sample data which does not exist in the sample data storage, the home network devices, which are connected to the inter-home content sharing apparatus through a home network and request a transmitting inter-home content sharing apparatus to share contents or release content sharing; and the remote storage which is connected to two or more inter-home content sharing apparatuses through an Internet, stores contents uploaded by the transmitting inter-home content sharing apparatus, extracts metadata of the uploaded contents, and transmits the metadata to a receiving inter-home content sharing apparatus, wherein the sample data is a portion of the content for generating the metadata.

10. An inter-home content sharing method using home network devices, the method comprising:

receiving, by a receiving inter-home content sharing apparatus, a notification message including sharing information on uploaded content from a transmitting inter-home content sharing apparatus which uploads content to a remote storage;

connecting, by the receiving inter-home content sharing apparatus, to the remote storage according to the received notification message, checking the uploaded content, and downloading metadata of the content from the remote storage;

transmitting, by the receiving inter-home content sharing apparatus, an event message based on the downloaded metadata to a receiving home network device;

downloading sample data of the content from the remote storage and storing the sample data in a sample data storage;

extracting sample data from the sample data storage and generating metadata based on the extracted sample data;

comparing the stored sample data with sharing information on the uploaded content; and connecting to the remote storage and downloading sample data which does not exist in the sample data storage, wherein the sample data is a portion of the content for generating the metadata.

11. The method of claim 10, wherein the event message indicates that the uploaded content in the remote storage is shared content.

12. An inter-home content sharing method using home network devices, the method comprising:

receiving, by a transmitting inter-home content sharing apparatus, a request for sharing content from a transmitting home network device;

uploading, by the transmitting inter-home content sharing apparatus, the content to a remote storage according to the sharing request;

transmitting, by the transmitting inter-home content sharing apparatus, a notification message including sharing information on the uploaded content to a receiving inter-home content sharing apparatus;

connecting, by the receiving inter-home content sharing apparatus, to the remote storage according to the notification message and downloading or extracting metadata of the uploaded content, downloading sample data of the content from the remote storage and storing the sample data in a sample data storage;

extracting sample data from the sample data storage and generating metadata based on the extracted sample data;

comparing the stored sample data with sharing information on the uploaded content; and connecting to the remote storage and downloading sample data which does not exist in the sample data storage, wherein the sample data is a portion of the content for generating the metadata.

13. The method of claim 10, further comprising:

downloading, by the transmitting inter-home content sharing apparatus, the content from the transmitting home network device, wherein the uploading the content comprises uploading the downloaded content.

14. The method of claim 12, wherein the connecting comprises:

connecting to the remote storage according to the notification message and downloading the metadata of the uploaded content; and transmitting an event message based on the downloaded metadata to a receiving home network device.

15. The method of claim 12, wherein the connecting comprises:

connecting to the remote storage according to the notification message and downloading sample data of the uploaded content;

extracting the metadata based on the sample data; and transmitting an event message based on the extracted metadata to a receiving home network apparatus.

16. The method of claim 14, wherein downloading sample data of the uploaded content comprises accessing a uniform resource locator (URL) of the remote storage which is generated by using a key value corresponding to the uploaded content.

17. The method of claim 15, wherein the downloading sample data of the uploaded content comprises accessing a uniform resource locator (URL) of the remote storage which is generated by using a key value corresponding to the uploaded content.

* * * * *